June 24, 1930.  W. BONSOR  1,765,752
CIRCUIT CLOSER
Filed March 21, 1928   2 Sheets-Sheet 2
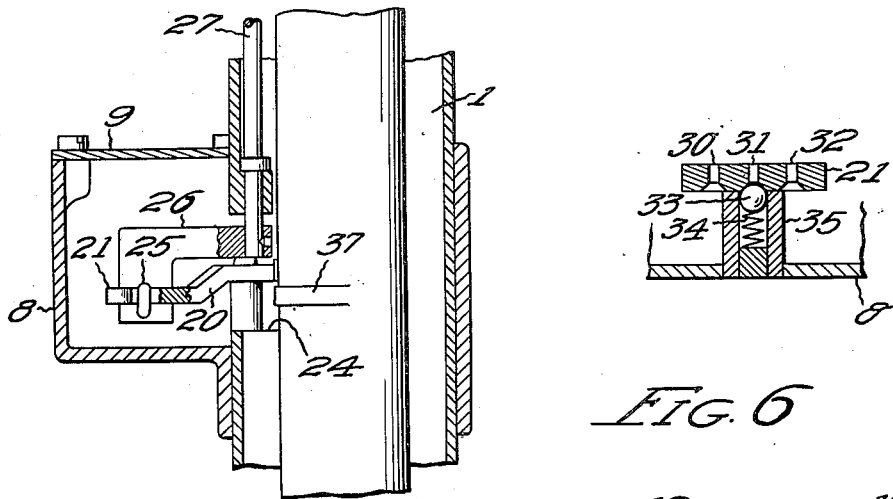
FIG. 5
FIG. 6
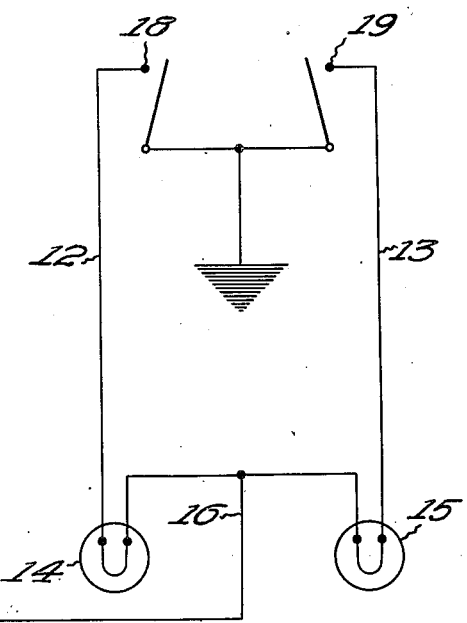
FIG. 7
FIG. 8
INVENTOR:
BY W. Bonsor
H.J. Danders
ATTORNEY.

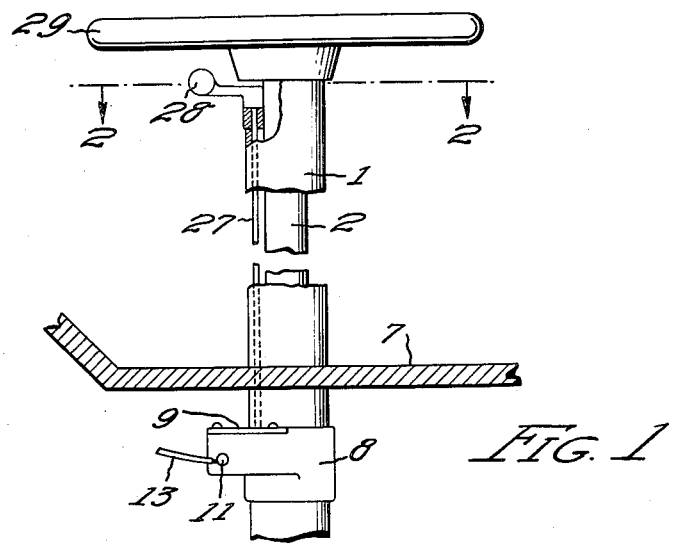
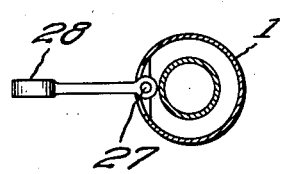
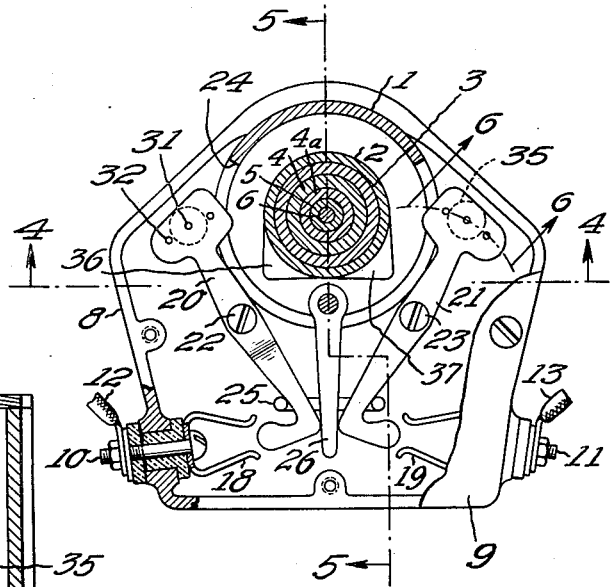
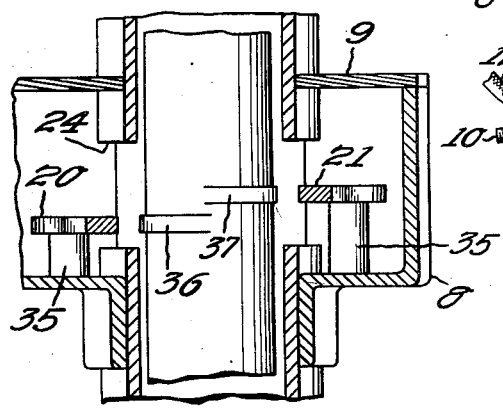

Patented June 24, 1930

1,765,752

UNITED STATES PATENT OFFICE

WALTER BONSOR, OF CHICAGO, ILLINOIS

CIRCUIT CLOSER

Application filed March 21, 1928. Serial No. 263,466.

This invention relates to circuit closer devices and more particularly to direction signals for vehicles and its chief object is to provide compact, durable, efficient visual signals for automobiles adapted to be built into the steering column whereby to apprise traffic of a contemplated change in the direction of movement of the vehicle.

A further object is to provide a signal adapted to be manually set to denote a turn or change in direction and, after the turn has been made, to be automatically repositioned at normal by the vehicle steering mechanism. The signal is capable of being manually returned to normal position in the event that the signal after being given has not been carried out by the vehicle.

With the foregoing and other objects in view the invention consists in the combination and arrangement of parts to be hereinafter fully described, pointed out in the claim and illustrated in the accompanying drawings which form a part of this application for patent and in which—

Fig. 1 is a fragmentary view of the circuit closer device applied to the steering column of an automobile.

Fig. 2 is a cross sectional view taken on line 2—2 of Fig. 1.

Fig. 3 is an enlarged fragmentary sectional view of the device as applied to the steering column, the latter being shown in cross section.

Fig. 4 is a vertical sectional view taken on line 4—4 of Fig. 3.

Fig. 5 is a similar view at right angles to Fig. 4 and is taken on line 5—5 of Fig. 3.

Fig. 6 is an enlarged fragmentary sectional view on line 6—6 of Fig. 3.

Fig. 7 is a face view of the lamp housing.

Fig. 8 is a diagrammatic view of the direction signal.

Like reference characters denote corresponding parts throughout the several views.

The present invention is built to the steering column and comprises a housing brazed to the column jacket and having mounted therein the signal actuating mechanism which is hand set from a handle or finger piece disposed immediately beneath the steering wheel, the finger piece and housed mechanism being connected by a rod running inside the column jacket.

The mechanism within said housing comprises two levers yoked together, one of said levers when moved out of its normal position closing an electric circuit to a lamp which is thereby energized to visualize a left turn signal, the other lever when moved out of its normal position in a predetermined manner closing an electric circuit to a lamp to visualize a right turn signal. After either lever has energized its lamp and the vehicle has made its turn the levers are returned to normal position by engagement with cams carried by the steering tube, there being two lever-engaging cams offset from each other so that the left hand lever is always engaged by its cam for return to normal and the right hand lever is likewise engaged only by its cam for like purpose.

The reference numeral 1 denotes the steering column jacket, 2 the steering tube, 3 the stationary tube, 4 the throttle tube, 4$^a$ the spark tube, 5 the light control tube and 6 the horn button connection. Brazed or otherwise secured to the steering column jacket 1 below the toe board 7 is the housing 8 provided with a cover 9. Mounted in the side walls of the casing opposite each other are the binding posts 10, 11, properly insulated from said housing, said posts being connected, respectively, by the electrical conductors 12, 13 with the left and right signal lamps 14, 15 secured upon the chassis or body of the vehicle at the rear, a conductor 16 also in circuit with said lamps leading to the battery 17.

The said binding posts 10, 11 carry, respectively, the connection clips 18, 19 disposed within the housing, the clip 18 being adapted for releasable contact with the lever 20 and the clip 19 for like contact with the lever 21, said levers being offset relatively and disposed in parallel planes and being fulcrumed upon posts 22, 23 arranged in the housing, the said column jacket 1 being formed with the transverse slot 24 to afford clearance for movement of said levers. The levers at their forward ends are connected by the yoke or ring 25 integral with the finger 26 that is fast to the rod 27 that extends longitudinally of the column jacket and at its upper end is engaged by the handle 28 that extends outwardly through a perforation in said jacket below the steering wheel 29.

Each lever 20, 21 is formed in one end with three perforations 30, 31, 32 arranged in the arc of a circle, the center of which may be the post fulcrum, and which circle intersects the circle described by rotation of the steering tube, one end of each perforation 30, 31 and 32 being flared to form a seat for a ball lock 33 yieldingly retained in any of said seats by the ball lock spring 34, said ball lock being arranged in the post 35 arranged in the said housing. There is then one ball lock for each lever 20 and 21 for yieldingly locking the same in an adjusted position relative to a post 35.

It will be noted that when both levers are so positioned relative to the posts 35 that the ball locks 33 are in the seats 31, or the central seats, of the levers the yoked ends of the levers are disengaged or out of contact with the clips 18, 19. When movement of the handle 28 by the finger of the operator causes movement of the rod 27 to the left the levers 20, 21 will move as a unit to the left and the lever 20 move into contact with the clip 18 thus energizing the lamp 14 denoting a left turn of the vehicle.

When the said handle 28 is likewise moved to the right it will cause a movement of levers 20, 21 to the right from the position shown in Fig. 3, or neutral, until the lever 21 contacts with the clip 19 thus closing an electric circuit to and energizing the lamp 15 visualizing the right turn signal. The movement of the levers 20 and 21 from neutral position to the right or left position unseats the ball lock 33 from seats 31 and seats them either at 32 or 30 in which position they will be yieldingly retained until forcibly moved therefrom.

Integral with the steering tube 2 are the cam lugs 36, 37 offset with relation to each other and disposed, respectively, in the planes of the levers 20, 21, each lug being adapted as the steering tube is rotated to intersect the path of movement of its lever and for engagement with said lever when the same is in contact with its clip to break such contact and reposition both levers neutral. It will be noted that cam 36 is offset relative to cam 37 and lever 21 and that cam 37 is likewise positioned relative to lever 20. With the levers 20, 21 in neutral position and the vehicle in straight ahead running position the relative position of the cams 36, 37 and the levers 20, 21 is such that one cam will intersect the path of movement of its lever when the vehicle is caused to make a quarter turn to the right or left. The position of these parts will depend upon the turning radius of the vehicle and will be determined at the factory and the proper relative positions there established.

When lever 20 is caused to close an electric circuit to lamp 14 as previously described and the vehicle then turned to the left the cam 36 will pass below the lever 21 and pass into contact or engagement with lever 20 at its perforated end thus moving this lever, together with lever 21, back to normal position.

When the lever 21 is engaged with clip 19 and the vehicle turned to the right the cam 37 will pass clear of lever 20 and finally contact with the perforated end of lever 21 repositioning the same, and lever 20, in neutral.

What is claimed is:—

In a circuit closer device for automobiles, a housing secured to the steering column jacket, binding posts in opposed walls of said housing, connection clips carried by said binding posts within said housing, contact levers fulcrumed in said housing and movable as an unit through a perforation in the steering column jacket for engagement with one of said connection clips at a time, said levers being offset with respect to each other, said levers being yieldingly retained normally in disengaged relation with said clips, a rod extending longitudinally of the column jacket, a handle for said rod, a finger fast to said rod, a yoke connecting said finger and levers, and cam lugs carried by the vehicle steering tube and offset to correspond to said levers for repositioning engagement therewith as the vehicle makes a quarter turn with said levers out of normal position.

In testimony that I claim the foregoing as my own I have hereto affixed my signature.

WALTER BONSOR.